United States Patent [19]
Frushour

[11] Patent Number: 5,645,617
[45] Date of Patent: Jul. 8, 1997

[54] COMPOSITE POLYCRYSTALLINE DIAMOND COMPACT WITH IMPROVED IMPACT AND THERMAL STABILITY

[76] Inventor: Robert H. Frushour, 2313 Devonshire, Ann Arbor, Mich. 48104

[21] Appl. No.: 523,868

[22] Filed: Sep. 6, 1995

[51] Int. Cl.⁶ .................................................. B24D 11/00
[52] U.S. Cl. ........................ 51/309; 51/295; 125/39; 407/119
[58] Field of Search ...................... 51/293, 309, 295; 125/39; 407/119

[56] References Cited

U.S. PATENT DOCUMENTS

| | | | |
|---|---|---|---|
| Re. 32,380 | 3/1987 | Wentorf, Jr. et al. | 407/119 |
| 2,944,323 | 7/1960 | Stadler | 407/118 |
| 2,947,610 | 8/1960 | Hall et al. | 427/142 |
| 2,992,900 | 7/1961 | Bovenkerk | 423/446 |
| 3,233,988 | 2/1966 | Wentorf, Jr. et al. | 51/307 |
| 3,745,623 | 7/1973 | Wentorf, Jr. et al. | 407/119 |
| 4,259,090 | 3/1981 | Bovenkerk | 51/309 |
| 4,260,397 | 4/1981 | Bovenkerk | 51/307 |
| 4,311,490 | 1/1982 | Bovenkerk et al. | 51/307 |
| 4,322,396 | 3/1982 | Strong | 423/446 |
| 4,411,672 | 10/1983 | Ishizuka | 51/309 |
| 4,481,180 | 11/1984 | Bedére et al. | 423/446 |
| 4,496,372 | 1/1985 | Almond et al. | 51/309 |
| 4,522,633 | 6/1985 | Dyer | 51/307 |
| 4,604,106 | 8/1986 | Hall et al. | 51/293 |
| 4,626,407 | 12/1986 | Veltri et al. | 419/18 |
| 4,629,373 | 12/1986 | Hall | 407/118 |
| 4,662,896 | 5/1987 | Dennis | 51/293 |
| 4,784,023 | 11/1988 | Dennis | 76/108 A |
| 4,789,385 | 12/1988 | Dyer et al. | 51/293 |
| 4,802,895 | 2/1989 | Burnand et al. | 51/293 |
| 4,875,907 | 10/1989 | Phaal et al. | 51/293 |
| 4,954,139 | 9/1990 | Cerotti | 51/293 |
| 5,011,509 | 4/1991 | Frushour | 51/293 |
| 5,011,515 | 4/1991 | Frushour | 51/307 |
| 5,032,147 | 7/1991 | Frushour | 51/309 |
| 5,190,734 | 3/1993 | Frushour | 422/242 |
| 5,351,772 | 10/1994 | Smith | 175/428 |
| 5,355,969 | 10/1994 | Hardy et al. | 175/432 |
| 5,379,854 | 1/1995 | Dennis | 175/434 |

*Primary Examiner*—Deborah Jones
*Attorney, Agent, or Firm*—Young & Basile, PC

[57] ABSTRACT

A compact blank for use in operations that require improved thermal stability, impact strength, and abrasion resistance is disclosed. The compact includes a substrate formed of tungsten carbide or other hard material with multiple abrasive diamond crystal layers bonded to the substrate. The abrasive diamond crystals are provided in successive layers of different size particles with the coarsest size particles being farthest away from the substrate. A catalyst is premixed with the diamond crystals in a weight percent which progressively decreases from the layer closest to the substrate through succeeding layers.

13 Claims, 1 Drawing Sheet

PRIOR ART

COMPOSITE POLYCRYSTALLINE DIAMOND COMPACT WITH IMPROVED IMPACT AND THERMAL STABILITY

BACKGROUND OF THE INVENTION

1. Field of the Invention

The present invention relates to a sintered polycrystalline diamond composite for use in rock drilling, machining of wear resistant metals, and other operations which require the high abrasion resistance or wear resistance of a diamond surface. Specifically, this invention relates to such bodies that include a polycrystalline diamond layer attached to a cemented metal carbide substrate via processing at ultrahigh pressures and temperatures.

2. Description of the Art

Composite polycrystalline diamond compacts or PCD have been used for industrial applications including rock drilling and metal machining for many years. One of the factors limiting the success of PCD is the strength of the bond between the polycrystalline diamond layer and the sintered metal carbide substrate. For example, analyses of the failure mode for drill bits used for deep hole rock drilling show that in approximately thirty-three percent of the cases, bit failure or wear is caused by delamination of the diamond from the metal carbide substrate.

Furthermore, when a precemented carbide mass is relied on to increase the impact resistance of PCD, the diamond layer is preferably relatively thin so that the diamond is never too far from its support. This restriction on the thickness of the diamond layer naturally limits both the life expectancy of the composite compact in use as well as the designs for PCD diamond tools.

Yet another problem that has limited the thickness of the diamond layer in composite compacts is caused by the problem of "bridging". Bridging refers to the phenomenon that occurs when a fine powder is pressed from multiple directions. It is observed that the individual particles in a powder being pressed tend to stack up and form arches or "bridges" that block the full amount of pressure so that the pressure often does not reach the center of the powder being pressed.

For optimal abrasion resistance of the compact product, very fine crystals of the abrasive are typically used, generally in particle size of less than 10 microns and preferably less than 5 microns. The fine abrasive crystals are crushed further under the high pressures applied during the compaction process resulting in a packing density of around 1.5 grams/cc increasing to greater than 2.5 grams/cc by crystal fracturing. The resulting abrasive mass is very dense and offers resistance to the catalyst metal or catalyst metal and carbide from sweeping through the crystal interstices. In practice, this resistance to sweep through by the dense, fractured abrasive crystals leads to soft spots of non-bonded abrasive. These soft spots are especially prevalent when the layer of abrasive crystals exceeds about 1 mm in thickness. Coarser abrasive crystals offer channels in the compacted mass that are less torturous for the bonding metal to sweep through; however, abrasion resistance considerations usually preclude the use of such coarse crystals as starting materials for the compact.

One of the solutions to these problems is proposed in the teaching of U.S. Pat. No. 4,604,106. This patent utilizes one or more transitional layers incorporating powdered mixtures with various percentages of diamond, tungsten carbide, and cobalt to distribute the stress caused by the difference in thermal expansion over a larger area. A problem with this solution is that the cobalt cemented carbide in the mixture weakens that portion of the diamond layer because less diamond-to-diamond direct bonding occurs as a result of the carbide second phase.

Other patents have discussed using grooved substrates in order to both increase the thickness of the diamond layer at certain locations and to increase the bond strength between the diamond layer and the substrate. For example, U.S. Pat. No. 4,784,023 teaches the grooving of polycrystalline diamond substrates; but does not teach the use of patterned substrates designed to uniformly reduce the stress between the polycrystalline diamond layer and the substrate support layer. In fact, this patent specifically mentions the use of undercut or dovetail portions of substrate grooves, which contributes to increased localized stress. FIG. 1 shows the region of highly concentrated stress that results from fabricating polycrystalline diamond composites with substrates that are grooved in a dovetail manner. Instead of reducing the stress between the polycrystalline diamond layer and the metallic substrate, the use of dovetail grooving actually makes the situation much worse. This is because the larger volume of metal at the top of the ridge will expand and contract during heating cycles to a greater extent than the polycrystalline diamond, forcing the composite to fracture at locations 1 and 2 shown in FIG. 1.

The disadvantage of using relatively few parallel grooves with planar side walls is that the stress again becomes concentrated along the top and, more importantly, the base of each groove and results in significant cracking of the metallic substrate along the edges 3 of the bottom of the groove as shown in FIG. 2. This cracking significantly weakens the substrate whose main purpose is to provide mechanical strength to the thin polycrystalline diamond layer. As a result, construction of a polycrystalline diamond cutter following the teachings provided by U.S. Pat. No. 4,784,023 is not suitable for cutting application where repeated high impact forces are encountered, such as in percussive drilling, nor in applications where extreme thermal shock is a consideration.

Other configurations have been proposed in order to overcome problems of stress in the compact due to the mismatch in thermal expansion between the diamond layer and the tungsten carbide substrate. For example, U.S. Pat. No. 5,351,772 describes the use of radially extending raised lands on one side of the tungsten carbide substrate area on which a polycrystalline diamond table is formed and bonded.

U.S. Pat. No. 5,011,515 describes a substrate with a surface topography formed by irregularities having non-planar side walls such that the concentration of substrate material continuously and gradually decreases at deeper penetrations into the diamond layer. U.S. Pat. No. 5,379,854 describes a substrate with a hemispherical interface between the diamond layer and the substrate, the hemispherical interface containing ridges that penetrate into the diamond layer. U.S. Pat. No. 5,355,969 describes an interface between the substrate and polycrystalline layer defined by a surface topography with radially-spaced-apart protuberances and depressions.

All of the above proposals show a diamond layer of varying thickness relative to the surface of the tungsten carbide substrate support. Thus, in areas where the diamond layer is thicker, the amount of cobalt available is less than in those areas where the diamond layer is thin. This results in a non-uniformly sintered diamond layer that substantially weakens the compact. Even when cobalt powder is premixed with the diamond prior to subjecting the compact to high pressure-high temperature conditions, the presence of cobalt in a substrate with a textured surface produces areas of varying concentration of cobalt within the diamond layer during the sintering process and causes soft spots or poorly sintered areas within the diamond layer.

U.S. Pat. No. 4,311,490 teaches the use of coarse diamond particles next to the tungsten support with a layer of finer diamond particles placed on top as the exposed cutting surface. This is reported to reduce the occurrence of soft spots or poorly sintered areas in the diamond table since the coarser particles have larger channels between them making it easier for cobalt to sweep through the diamond nearest the tungsten carbide substrate, thus allowing thicker diamond layers to be sintered. For rock drilling applications, however, it has been found that although finer diamond results in higher abrasion resistance, it also results in significantly less impact resistance. The lower impact resistance produces compact cutter failure by way of fracturing and spalling of the diamond layer from the tungsten carbide support substrate.

Thus, two problems remain: one of producing a compact with the advantages of using a substrate with a non-planar interface without the drawback of soft spots or otherwise poor, non-uniformly sintered areas and second, maintaining a higher abrasion resistant compact for rock drilling without loss of impact resistance.

SUMMARY OF THE INVENTION

The instant invention is a polycrystalline diamond compact that has at least two layers of abrasive crystals or diamond of different average crystal size in each separate layer, wherein the layer with the coarsest average particle size and the most impact resistance is disposed as the outermost layer and the layer with the finest average particle size between the outermost diamond layer and a disposed substrate. The fine layer offers the most abrasion resistance for rock drilling and is protected from impact by the outer layer of coarse diamond. In order to obtain uniform sintering, a catalyst, such as cobalt powder, is added at least to the layer of fine diamond. This addition of cobalt powder aids in the conventional sweep through process whereby the higher concentration of cobalt in the substrate migrates through the mass of diamond particles and sinters these crystals together and tightly bonds them to the substrate.

The catalyst may be premixed in each layer with the weight percent of the catalyst varying from a highest weight percent in the crystal layer immediately adjacent to the substrate to progressively lower weight percents in successive layers further away from the substrate.

Alternately, the crystal or diamond layers may have the same average particle size, with only the weight percent of catalyst in each layer decreasing in weight percent from the highest weight percent in the crystal layer immediately adjacent to the substrate, to lower weight percents through succeeding layers.

This invention also greatly improves compacts made using textured substrates because prior art methods of directly placing a uniform layer of diamond or a single layer of diamond plus cobalt powder adjacent to the substrate results in a non-uniform sintering of the diamond layer due to the varying thickness of the substrate and the resultant varying concentration of cobalt readily available for the sintering process. By mixing a diamond layer with cobalt powder and placing this layer in the valleys of the textured substrate and then adding a second diamond layer with a lower weight-percent cobalt powder or without any cobalt, the amount of total cobalt available for sintering the outermost diamond layer is distributed more evenly over the area of interfaces between the diamond layers. This reduces the occurrence of soft spots where poor sintering has occurred due to a deficiency or non-uniform supply of catalyst metal and greatly improves the strength of the compact blank.

BRIEF DESCRIPTION OF THE DRAWING

The various features, advantages and other uses of the present invention will become more apparent by referring to the following detailed description and drawing in which.

DETAILED DESCRIPTION OF THE PREFERRED EMBODIMENTS

In the following description, it should be understood that the crystal layers described hereafter as formed of polycrystalline diamond, PCD, or sintered diamond as the material is often referred to in the art, can also be any of the superhard abrasive materials, including but not limited to, synthetic or natural diamond, cubic boron nitride, and wurzite boron nitride as well as combinations thereof.

Also, the cemented metal carbide substrate refers to a carbide of one of the group IVB, VB, or VIB metals which is pressed and sintered in the presence of a binder of cobalt, nickel, iron and the alloys thereof.

Figure 1:
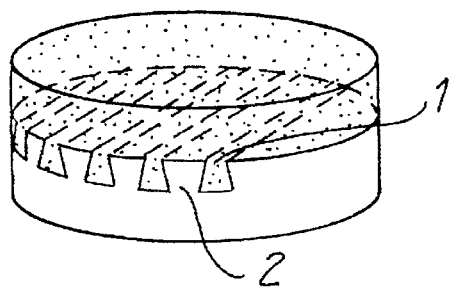
FIG. 1 is a perspective view of a prior art PCD.
Figure 2:
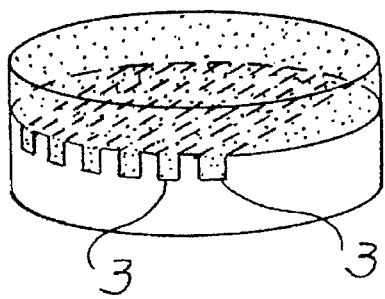
FIG. 2 is a perspective view of another prior art PCD.
Figure 3:
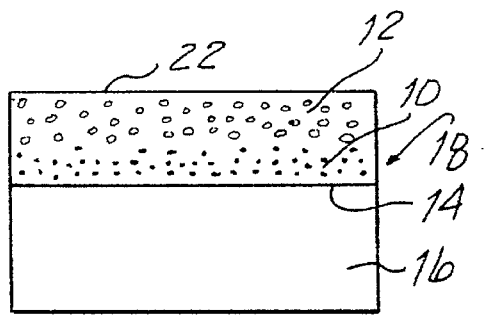
FIG. 3 is a cross-sectional view of one embodiment of a PCD according to the present invention.
Figure 4:
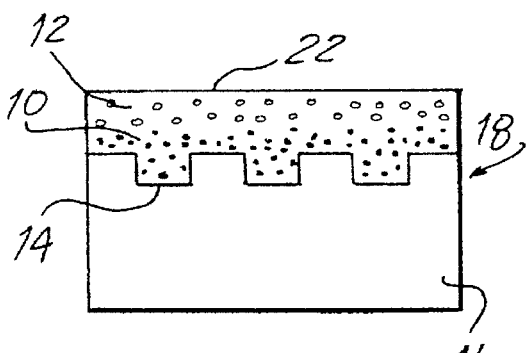
FIG. 4 is a cross-sectional view of another embodiment of a PCD according to the present invention.

FIGS. 3 and 4 show two similar embodiments of this invention. These views show a plurality of layers 10, 12 of abrasive crystals, such as diamond, and the interface 14 between the crystal layers 10, 12 and a substrate 16 in a polycrystalline compact or cutting element 18.

The substrate 16 is preferably formed of a hard metal. In a specific example, the substrate 16 is formed of a metal carbide selected from the group consisting of tungsten carbide, titanium carbide, tantalum carbide, and mixtures thereof. The substrate 16 may also be formed of a carbide from the group of IVB, VB, or VIB metals which is pressed and sintered in the presence of a binder of cobalt, nickel, iron and alloys thereof.

In FIG. 3, the interface 14 between one crystal layer 10 and the substrate 16 has a planar or flat configuration. In FIG. 4, the substrate 16 is formed with a plurality of spaced, generally parallel, grooves. The grooves may be straight sided as shown in FIG. 4 or formed as dovetail groves with inward angled sidewalls. Other surface topographies known in the art may also be employed in the PCD compact 18.

The plurality of layers 10, 12 of abrasive crystals, such as diamonds, are overlaid on each other. An important aspect of the first embodiment of this invention is that the at least two layers of diamond 10, 12 each have a different crystal coarseness whereby the layer 10 most immediately adjacent to the substrate 16 has a finer average particle size than the adjacent layer 12 which has a coarser average particle size. Although only two layers 10, 12 are illustrated in FIGS. 3 and 4, it will be understood that any number of layers may be used to form the polycrystalline compact 18 with the outermost layer, i.e., farthest away from the substrate 16, having the coarsest or largest average crystal size.

In another embodiment, a catalyst may be premixed with at least certain of the crystal layers 10 and 12. Preferably, the layer 10 immediately adjacent to the substrate 16 is premixed with a catalyst at a higher weight-percent of catalyst than the catalyst premixed with the adjacent second diamond layer 12 and has a finer distribution of particle size diamond. Preferably, the catalyst is a metal selected from the Group VIII metals. Cobalt can be used as a preferred catalyst metal, by example only.

The addition of the catalyst, such as cobalt powder, aids in the conventional sweep through process whereby the higher concentration of cobalt in the substrate migrates through the mass of diamond particles and sinters these crystals together and tightly bonds the crystals to the substrate.

Other methods of cobalt addition may be used in order to produce a cobalt-rich area near or within the layer of fine diamond particles. For example, a cobalt disc may be placed directly adjacent to the layer of fine diamond particles or a substrate may be used with a higher than normal concentration of cobalt. Either way, the end result is that the concentration of cobalt is higher in the finer diamond layers than in the coarser diamond layers.

Figure 5:
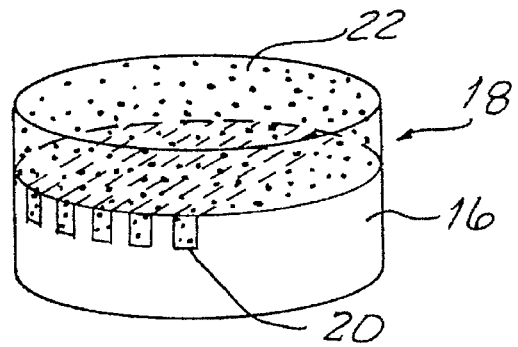
FIG. 5 is a cross-sectional view of yet another embodiment of a PCD according to the present invention.

In the case of textured substrates wherein the topography of the interface between the diamond layer and the substrate varies as, for example, in FIG. 5, the diamond crystals in the layer 10 next to the substrate 16 may have the same amount of cobalt as the next outermost layer 12 prior to high pressure-high temperature processing provided an additional source of cobalt 20 is placed in the valleys of the topography at the interface 14 between the substrate 16 and crystal layer 10.

There may be more than two layers of diamond varying both in particle size and weight-percent of cobalt. The particle size of the diamond increases and the weight-percent of cobalt decreases with each successive layer proceeding from the substrate 16 toward the outermost diamond layer 12 which has at least one exposed surface 22 engagable with a work material.

Alternately, each diamond crystal layer 10, 12, etc. may have the same average particle size; but the catalyst in each layer 10, 12 decreases from layer to layer from a highest weight percent of catalyst in the layer 10 immediately adjacent to the substrate 16.

In a process for preparing the polycrystalline diamond compact 18 according to the present invention, the layers 10, 12 of abrasive or diamond crystals are successively placed in a protective shield enclosure in a reaction cell of a high pressure/high temperature apparatus, such as a conventional reaction vessel. The outermost layer 12 is placed in the enclosure first followed by the layer 10. The substrate 16 is then placed in the enclosure in contact with the layer 10 at the interface 14. High pressure and high temperature are then applied to the enclosure according to known techniques to sinter or join the diamond crystals in each layer 10 and 12 to each other, to sinter the layers 10 and 12 together, and to sinter the layer 10 to the substrate 16 at the interface 14.

EXAMPLES

Example 1

A 250-milligram sample of 25 micron diamond powder is placed in a molybdenum cup. Next, a 250-milligram sample of 10 micron diamond powder that has been thoroughly blended with 10 weight-percent cobalt powder is placed into the cup on top of the 25 micron diamond powder. Finally, a cobalt cemented tungsten carbide substrate is placed into the cup on top of the 10-micron diamond/cobalt powder mixture. This assembly is loaded into a high pressure cell and pressed to 45 K-bars for fifteen minutes at 1450° C. After cutting the power to the cell and allowing the cell to cool at high pressure for one minute, the pressure is released. The composite bodies are removed from the other cell components and then lapped and ground to final dimensions.

Example 2

A 250-milligram sample of 25 micron diamond powder is placed in a molybdenum cup. Next, a 250-milligram sample of 25 micron diamond powder that has been thoroughly blended with 10 weight-percent cobalt powder is placed into the cup on top of the 25 micron diamond powder. Finally, a cobalt cemented tungsten carbide substrate is placed into the cup on top of the 25-micron diamond/cobalt powder mixture. This assembly is loaded into a high pressure cell and pressed to 45 K-bars for ten minutes at 1450° C. After cutting the power to the cell and allowing the cell to cool at high pressure for one minutes, the pressure is released. The composite bodies are removed from the other cell components and then lapped and ground to final dimensions.

What is claimed is:

1. A process for preparing a polycrystalline diamond compact in a protective shield enclosure in a reaction cell of a high pressure/high temperature apparatus, the process comprising the steps of:

placing a mass of abrasive crystals in successive layers varying from coarser to finest crystals in successive layers in a protective shield enclosure;

placing a substrate in a protective shield enclosure, the substrate contacting the finest layer of crystals; and subjecting the layers of abrasive crystals and the substrate to high pressure and high temperature to bond the layers to each other and to the substrate.

2. The process of claim 1 wherein the substrate is a metal carbide selected from the group consisting of tungsten carbide, titanium carbide, tantalum carbide, and mixtures thereof.

3. The process of claim 1 further comprising the step of premixing at least one of the layers of crystals with a catalyst metal selected from the Group VIII metals.

4. The process of claim 1 further comprising the step of premixing the layers of crystals with a catalyst metal selected from the Group VIII metals such that the layers closest to the substrate have a higher weight-percent of the catalyst metal than layers farther away from the substrate.

5. A process for preparing a polycrystalline diamond compact in a protective shield enclosure in a reaction cell of a high pressure/high temperature apparatus, the process comprising the steps of:

placing a mass of abrasive crystals in successive layers in a protective shield enclosure;

placing a substrate in a protective shield enclosure in contact with one of the layers of crystals;

premixing a catalyst in at least the layers of crystals closest to the substrate, the weight percent of the catalyst decreasing from layer to layer from a highest weight percent of catalyst in the layers of crystals contacting the substrate; and subjecting the layers of abrasive crystals and the substrate to high pressure and high temperature to bond the layers to each other and to the substrate.

6. The process of claim 5 wherein
the substrate is a metal carbide selected from the group consisting of tungsten carbide, titanium carbide, tantalum carbide, and mixtures thereof.

7. The process of claim 5 wherein
the catalyst is a metal carbide selected from the group consisting of tungsten carbide, titanium carbide, tantalum carbide, and mixtures thereof.

8. The process of claim 5 wherein
the catalyst is a metal selected from the Group VIII metals.

9. A composite polycrystalline cutting element comprising:

a first layer with at least one exposed surface adapted for contacting a work material, the first layer comprised of a polycrystalline diamond material in which adjacent diamond crystals are bonded together, a second layer joined at an interface with the first layer, the second layer comprised of a polycrystalline diamond material in which the average particle size of diamond is finer than the average particle size of diamond in the first layer and adjacent diamond crystals are bonded together; and a substrate contacting the second layer and supporting the first and second layers.

10. The cutting element of claim 9 wherein
the substrate is a metal carbide selected from the group consisting of tungsten carbide, titanium carbide, tantalum carbide, and mixtures thereof.

11. The cutting element of claim 9 wherein
at least one of the layers of crystals are premixed with a catalyst metal selected from the Group VIII metals.

12. The cutting element of claim 9 wherein
the layers of crystals are premixed with a catalyst metal selected from the Group VIII metals; and the layers closest to the substrate have a higher weight-percent of the premixed catalyst metal than layers farther away from the substrate.

13. A composite polycrystalline body for engaging a work material comprising:

a first layer of polycrystalline diamond in which adjacent diamond crystals are bonded together; and a second layer disposed at an interface with the first layer, the second layer formed of a polycrystalline diamond wherein the average particle size of the polycrystalline diamond is finer than the average particle size of the polycrystalline diamond in the first layer and adjacent diamond crystals are bonded together;

the first layer positioned outermost for engagement with a work material.

* * * * *